US012742389B2

(12) United States Patent
Wang et al.

(10) Patent No.: US 12,742,389 B2
(45) Date of Patent: Sep. 22, 2026

(54) METHOD FOR COAL SEAM GAS SEEPAGE DISPLACEMENT, SEEPAGE WATER LOCKING AND DUST REDUCTION

(71) Applicant: Hunan University of Science & Technology, Xiangtan (CN)

(72) Inventors: Pengfei Wang, Xiangtan (CN); Yong Chen, Xiangtan (CN); Yongjun Li, Xiangtan (CN); Shilin Li, Xiangtan (CN); Xinzhe Wang, Xiangtan (CN); Yan Cui, Xiangtan (CN)

(73) Assignee: Hunan University of Science & Technology, Xiangtan (CN)

( * ) Notice: Subject to any disclaimer, the term of this patent is extended or adjusted under 35 U.S.C. 154(b) by 0 days.

(21) Appl. No.: 19/368,549

(22) Filed: Oct. 24, 2025

(65) Prior Publication Data

US 2026/0110250 A1 Apr. 23, 2026

(30) Foreign Application Priority Data

Jul. 23, 2025 (CN) ........................ 202511018491.7

(51) Int. Cl.
*E21B 43/16* (2006.01)
*C09K 8/584* (2006.01)
(Continued)

(52) U.S. Cl.
CPC ................ *E21F 7/00* (2013.01); *C09K 8/584* (2013.01); *C09K 8/94* (2013.01); *E21B 43/006* (2013.01); *E21B 43/166* (2013.01); *E21F 5/02* (2013.01)

(58) Field of Classification Search
None
See application file for complete search history.

(56) References Cited

U.S. PATENT DOCUMENTS

2011/0011589 A1* 1/2011 Zhang ...................... B03D 1/02 166/305.1
2016/0122628 A1* 5/2016 Babcock ............... E21B 43/164 166/305.1

(Continued)

FOREIGN PATENT DOCUMENTS

CN 103195471 A 7/2013
CN 115962005 A 4/2023
CN 120556966 A 8/2025

*Primary Examiner* — Andrew Sue-Ako
(74) *Attorney, Agent, or Firm* — JEEN IP LAW, LLC

(57) ABSTRACT

The present invention provides a method for coal seam gas seepage displacement, seepage water locking and dust reduction. During the injection period, a pressure pump and pumping system are used to control the pressure and pumping flow rate, and a micro-nano bubble surface active liquid coupling medium is used for seepage displacement of coal seam gas, ensuring efficient discharge or extraction of coal seam gas. After the injection is completed, the micro-nano bubbles surface-active liquid coupling medium is stored in the coal seam, and the coal seam is subjected to seepage water locking and dust reduction. Through the seepage displacement, the seepage velocity of coal seam gas is increased. Through the seepage water locks, the desorption rate of coal seam gas is suppressed. Through the dust reduction, the wetting reversal of coal seams can be achieved, and the moisture content is increased, thereby reducing the generation of dust.

10 Claims, 10 Drawing Sheets

(51) Int. Cl.

| | |
|---|---|
| ***C09K 8/94*** | (2006.01) |
| ***E21B 43/00*** | (2006.01) |
| ***E21F 5/02*** | (2006.01) |
| ***E21F 7/00*** | (2006.01) |

(56) References Cited

U.S. PATENT DOCUMENTS

| | | | | |
|---|---|---|---|---|
| 2023/0112608 | A1* | 4/2023 | Grieco | C25B 1/16 252/372 |
| 2024/0228880 | A1* | 7/2024 | Lv | C09K 23/16 |
| 2025/0084740 | A1* | 3/2025 | Almajid | E21B 43/255 |

* cited by examiner

METHOD FOR COAL SEAM GAS SEEPAGE DISPLACEMENT, SEEPAGE WATER LOCKING AND DUST REDUCTION

CROSS-REFERENCE TO RELATED APPLICATIONS

The application claims priority to Chinese patent application No. 202511018491.7, filed on Jul. 23, 2025, the entire contents of which are incorporated herein by reference.

TECHNICAL FIELD

The present invention belongs to the field of gas prevention and control technology, and particularly relates to a coal seam gas seepage displacement seepage water locking dust reduction method that synergistically enhances the effect of micro-nano bubbles and surfactants.

BACKGROUND

Coal, as an important energy resource, occupies an irreplaceable position in economic development and energy security. However, in the process of formation and occurrence of coal seams, due to the influence of geological processes, deep coal bodies exhibit their true attributes of "high ground stress, high gas pressure, high gas content, and low permeability". Moreover, coal mining conditions are complex, and deep mining also has additional attributes of "strong disturbance and strong timeliness". These characteristics bring many challenges in coal seam mining and gas extraction processes.

At present, gas prevention and permeability enhancement technologies such as hydraulic punching, hydraulic fracturing, and hydraulic slotting have been developed to characterize the effect of water media on coal. However, traditional hydraulic measures mainly rely on the mechanical action of high-pressure water, which has limited effects on improving coal seam permeability and is difficult to significantly improve gas extraction efficiency. Secondly, due to the limitations of coal seam geological conditions, traditional hydraulic measures have poor applicability in complex coal seams and are difficult to meet the needs of different coal seams. In addition, high-pressure hydraulic measures may cause safety accidents such as coal seam water inrush and roof collapse, posing a threat to coal mine safety production.

At the same time, China's coal resources are widely distributed, and the vast majority rely on underground mining, especially in the context of the gradual evolution of kilometer deep well mining into a new normal of mining. The associated disasters during coal mining are more complex, and there are significant differences between the north and south. Taking the Changyan coal mining area in Yonglong, Shaanxi and the anthracite mining area in Laochang, Yunnan as examples, the gas emission from the mining face can reach 15 $m^3$/min and 34 $m^3$/min respectively, with a difference of 19 $m^3$/min. The maximum gas desorption index K1 values for drilling cuttings are 0.20 mL/(g·$min^{1/2}$) and 1.75 mL/(g·$min^{1/2}$), respectively, with a difference of 1.55 mL/(g·$min^{1/2}$). Therefore, achieving efficient and safe extraction of coalbed methane is an important support for the high-quality development of coal mines in China, and also an important link in liberating high-quality productivity.

On the other hand, with the continuous improvement of mechanization level in the comprehensive mining face, the dust hazards in the underground operation areas seriously threaten the physical and mental health of miners. The dust concentration in the comprehensive excavation face is generally 2000-3000 mg/$m^3$ without dust prevention measures. Even with measures taken, the working environment of most comprehensive excavation work faces is still quite harsh. The maximum dust concentration at the work site of comprehensive excavation machine drivers can reach 400-900 mg/$m^3$, which far exceeds the national regulatory limit. Dust has seriously endangered the health of underground workers and threatened coal mine safety production.

SUMMARY

The purpose of the present invention is to provide a coal seam gas seepage displacement seepage water locking dust reduction method with synergistic effect of micro-nano bubbles and surfactants, which solves the problems of low extraction efficiency, coal gas desorption and gas emission, poor applicability, and high dust concentration that can easily cause safety accidents of traditional hydraulic measures.

The present invention is implemented by the following technical solutions:

A method for coal seam gas seepage displacement, seepage water locking and dust reduction, comprising the following steps:

S1. Coal seam occurrence analysis: conducting liquid injection boreholes and boundary control boreholes based on the occurrence of coal seams, and recording parameters;

wherein the liquid injection boreholes are configured for injecting micro-nano bubble surface active liquid coupling medium, and the boundary control boreholes is used for controlling gas flow and discharge direction;

S2. Preparation of liquid gas coupling medium: adding surfactants and water into a preparation container to obtain a surfactant aqueous solution, cyclically extracting and discharging the surfactant aqueous solution through a micro-nano bubble generator, and converting the gas into micro-nano bubbles through a micro-nano bubble nozzle for mixing into the surfactant aqueous solution for coupling, thereby obtaining a micro-nano bubble surface active liquid coupling medium;

S3. Seepage displacement: using a pressure pump and a pumping system, injecting the micro-nano bubble surface active liquid coupling medium in step S2 into the coal seam through the liquid injection boreholes to perform seepage displacement of coal seam gas, achieving coal seam gas discharge or extraction;

S4. Seepage water locking: when the micro-nano bubble surface active liquid coupling medium described in step S3 is stored in the coal seam, performing seepage water locking to the coal seam to realize the desorption speed suppression and emission intensity reduction of the coal seam gas;

S5. Dust reduction: when the micro-nano bubble surface active liquid coupling medium described in step S3 is stored in the coal seam, moistening the coal seam to achieve the reversal of coal seam wetting and increasing the water content.

The synergistic effect of micro-nano bubbles and surfactants in the coal seam gas seepage displacement seepage water locking dust reduction method of the present invention is suitable for coal seam gas pre-extraction and working face mining. Firstly, a micro-nano bubble generator is used to cyclically extract and discharge the surfactant aqueous solution. Combined with a micro-nano bubble nozzle, the gas is efficiently converted into smaller and more uniform micro-nano bubbles, which are mixed into the surfactant aqueous solution to achieve stable coupling between micro-nano bubbles and the liquid, forming a micro-nano bubble surface active liquid coupling medium. Secondly, coal seams usually have low permeability and complex and irregular pore structures, with many branches and blind spots. During the liquid injection period, a pressure pump and pumping system are used to effectively inject micro-nano bubbles surface active liquid coupling medium into the coal seam through the injection drilling by controlling the pressure and pumping flow rate. This overcomes the resistance of the coal seam to the liquid, ensures the uniform distribution of gas-liquid coupling medium in the coal seam, and can flow along a path conducive to gas extraction, thereby improving the permeability of the coal seam and enhancing gas extraction efficiency. Thirdly, after the injection is completed, when the gas-liquid coupling medium is stored in the coal seam, the coal seam can be gradually subjected to seepage water locking or dust reduction, or seepage water locking and dust reduction can be carried out simultaneously. The effect and action period can be determined by measuring and observing relevant operating parameters.

When using a micro-nano bubble surface active liquid coupling medium for dust reduction, surfactants react chemically with water molecules through hydrophilic and oleophilic groups in their internal structure, changing the interfacial properties and wetting characteristics of water, thereby promoting the diffusion and permeation of water on the solid surface of coal seams, improving the contact efficiency between water and other substances, and enhancing wetting performance. On the other hand, when micro-nano bubbles form, rise, and rupture in water, they generate instantaneous high pressure and microfluidic effects. This process can break down the binding structure of large molecule clusters in water and decompose them into more flexible small molecule clusters. At the same time, micro-nano bubbles can also change the arrangement of water molecules, optimize the adsorption mechanism of surfactants on the surface of aqueous solutions, and enable surfactants to be more evenly distributed in aqueous solutions, further improving the dust reduction ability of aqueous solutions. After the synergism of micro-nano bubbles and surfactants, the surface tension is significantly reduced, which enables the spray medium to better wet and coagulate the dust particles, thus improving the dust reduction efficiency of coal seams, reducing the waste of water resources and reducing the risk of secondary pollution.

Preferably, the type of liquid injection boreholes and boundary control boreholes in step S1 is one of through-layer boreholes or bedding boreholes.

The present invention selects appropriate drilling types and determines drilling parameters according to the situation, such as drilling inclination angle, drilling aperture, drilling length, and drilling spacing, so that the drilling can selectively extend in different directions in the coal seam, optimize the flow path in the coal seam, promote gas flow and extraction, increase pore connectivity in the coal seam, improve coal seam permeability, enhance gas extraction efficiency and effectiveness, and adapt to different coal seam occurrence and geological conditions.

Preferably, the surfactant in step S2 is one of hexadecyltrimethylammonium bromide, polyacrylamide, or polyethylene oxide.

The present invention changes the rheological properties of liquids through surface active liquids with surface expansion, low viscosity and drag reduction, and charge modification characteristics, reducing the surface tension and viscosity of liquids, enhancing the fluidity and permeability of liquids in coal seams, increasing the wettability of liquids on coal seams, and making it easier for liquids to penetrate into the pores of coal seams. Different surfactants have different wetting properties and interactions with coal seams. Choosing the appropriate surfactant can optimize the interaction between the liquid and the coal seam, improve the retention time and effectiveness of the liquid in the coal seam.

Among them, based on drilling parameters such as drilling aperture, drilling length, and drilling spacing, the coal seam control range and water injection volume are determined. Then, the surfactant mass fraction is determined by the water injection volume to obtain the surfactant aqueous solution. Preferably, the mass fraction of the surfactant is 0.005-0.05%.

Specifically, cetyltrimethylammonium bromide (CTAB) is a cationic surfactant with excellent surface activity and wetting properties. It can reduce the surface tension of the liquid, increase the wettability of the liquid to the coal seam, and make it easier for the liquid to penetrate into the pores of the coal seam. Polyacrylamide (PAM) is a high molecular weight polymer with excellent drag reduction and flocculation properties. It can reduce the viscosity of liquids, increase their fluidity, and thus reduce the flow resistance of liquids in coal seams. Polyethylene oxide (PEO) is a non-ionic polymer with excellent drag reduction and dispersion properties. It can reduce the viscosity of liquids, increase their fluidity, and thus reduce the flow resistance of liquids in coal seams.

Preferably, the gas in step S2 is one of air, carbon dioxide, or nitrogen.

The present invention can control the generation, size, stability, and surface properties of micro-nano bubbles by selecting appropriate gases. The micro-nano bubbles have the characteristics of large specific surface area, high mass transfer efficiency, inherent surface potential, self-dissolution and pressurization, and surface drag reduction. By working together with surfactants, they can better regulate the surface tension of liquids, optimize the interaction between gas-liquid coupling media and coal seams, improve the penetration rate and efficiency of liquids in coal seams, and enhance the gas extraction effect.

More preferably, micro nano bubbles account for 45%-90% of the micro nano bubble surface active liquid coupling medium.

Preferably, when the micro-nano bubble surface active liquid coupling medium in step S3 is injected into the coal seam, the pressure is set to low pressure, medium pressure, high pressure, and ultra-high pressure; the low pressure is ≤10 MPa, the medium pressure is 10-30 MPa, the high pressure is 30-50 Mpa, and the ultra-high pressure is 50 MPa.

The present invention improves the flexibility and applicability of operations by setting different injection pressure levels (low pressure≤10 MPa, medium pressure 10-30 MPa, high pressure 30-50 MPa, ultra-high pressure 50 MPa), selecting appropriate injection pressures based on the geological conditions of the coal seam and gas extraction requirements. Different injection pressures have varying impacts on the effectiveness of gas extraction. Low pressure injection can reduce disturbance to coal seams and is suitable for coal seams with good permeability; Medium pressure injection can provide sufficient pressure to allow the coupling medium to effectively penetrate into the pores of the coal seam, suitable for coal seams with average permeability; High pressure and ultra-high pressure injection can overcome the high permeability resistance of coal seams, allowing the coupling medium to penetrate deeper into the coal seam, making it suitable for coal seams with poor permeability.

Preferably, when the micro-nano bubble surface active liquid coupling medium in step S3 is injected into the coal seam, the pumping flow rate is 10 $m^3$/h, 15 $m^3$/h, 20 $m^3$/h, 30 $m^3$/h, 40 $m^3$/h, 50 $m^3$/h, 60 $m^3$/h or 70 $m^3$/h.

The present invention provides multiple pumping flow options (10 $m^3$/h, 15 $m^3$/h, 20 $m^3$/h, 30 $m^3$/h, 40 $m^3$/h, 50 $m^3$/h, 60 $m^3$/h, or 70 $m^3$/h) to select the appropriate pumping flow rate based on the geological conditions of the coal seam and gas extraction requirements, thereby improving operational flexibility and applicability. Different pumping flow rates have varying effects on gas extraction efficiency. A smaller pumping flow rate can increase the residence time of the coupling medium in the coal seam, allowing it to interact more fully with the coal seam and be suitable for coal seams with better permeability. A larger pumping flow rate can increase the permeability of the coupling medium in the coal seam, allowing it to reach the deep part of the coal seam more quickly, which is suitable for coal seams with poor permeability.

Preferably, an injection time for injecting the micro-nano bubble surface active liquid coupling medium in step S3 into the coal seam is based on water outflow from the coal wall, water outflow from the boundary boreholes, or a 30% decrease in water injection pressure.

The present invention ensures the uniformity of the injection amount and distribution of the coupling medium in the coal seam by setting termination conditions for the injection time. When water flows out of the coal wall, boundary boreholes, or when the water injection pressure drops by 30%, it indicates that the coupling medium has been fully injected into the coal seam or the coal seam has reached saturation. Stopping the injection at this time can avoid excessive or insufficient injection.

Preferably, during the seepage displacement in step S3, when coal seam gas is discharged, the boundary control borehole is in a natural discharge state; when the coal seam gas is extracted, the boundary control boreholes are merged into extraction pipeline network.

In the present invention, during the seepage displacement period, when the coal seam gas is discharged, the boundary control boreholes is in a natural discharge state, ensuring that the coal seam gas can be smoothly discharged through the boreholes, thereby reducing the accumulation of the coal seam gas in the coal seam, and reducing the risk of gas explosion and coal and gas outburst. When the coal seam gas is extracted, the boundary control boreholes are connected into the extraction pipeline network to increase the gas extraction path and improve the efficiency of gas extraction.

Preferably, during the seepage water locking in step S4, the boundary control borehole is in a natural discharge state.

In the present invention, during the seepage water locking period, the boundary control boreholes are maintained in a natural discharge state, ensuring that the water during the seepage water locking process can be smoothly discharged through the boreholes, thereby reducing the accumulations of infiltration water in the coal seam and reducing the impact of infiltration water on the permeability of the coal seam.

Preferably, during the seepage displacement in step S3, the effect and action period of the seepage displacement are determined by the concentration and flow rate of the boundary control boreholes.

Preferably, during the seepage water locking in step S4, the effect and action period of the seepage water locking are determined by measuring the coal seam gas content at different distances from the liquid injection boreholes, the gas desorption index K1 value of the drilling cuttings, and the gas emission volume during excavation and mining.

Preferably, during the dust reduction in step S5, the dust reduction effect and action period are determined by measuring the coal seam moisture content, wetting degree, dust generation volume during mining operations, dust particle size, and dust concentration at different distances from the injection boreholes.

The beneficial effects of the present invention are as follows:

The present invention provides a method for coal seam gas seepage displacement, seepage water locking and dust reduction, with synergistic effect of micro-nano bubbles surface active agents. The method adopts a multi-stage comprehensive prevention and control of gas and dust. During the injection period, a pressure pump and a pumping system are used to control the pressure and pumping flow rate. The micro-nano bubbles surface active liquid coupling medium is used for permeation displacement of coal seam gas, ensuring efficient discharge or extraction of coal seam gas. After the injection is completed, the coal seam is stored in a coupling medium of micro-nano bubbles and surface-active liquid, and the coal seam is subjected to seepage water locking and dust reduction. Through the seepage displacement, the seepage velocity of coal seam gas is increased, and the pre-extraction efficiency of the coal seam gas is improved. Through the seepage water locking, the desorption rate of coal seam gas is suppressed, the intensity of gas emission is reduced, and the prevention and control of gas emission and safe and efficient mining in the working face are achieved. Through the dust reduction, the wetting reversal of coal seams can be achieved, the moisture content is increased, thereby reducing the generation of dust and achieving efficient prevention and control of dust in the working space of underground coal mining operations, improving the safety of coal mining.

DETAILED DESCRIPTION OF THE EMBODIMENTS

The specific technical solution of the present invention will be described below in conjunction with FIG. 1 and Embodiment 1.

Figure 1:
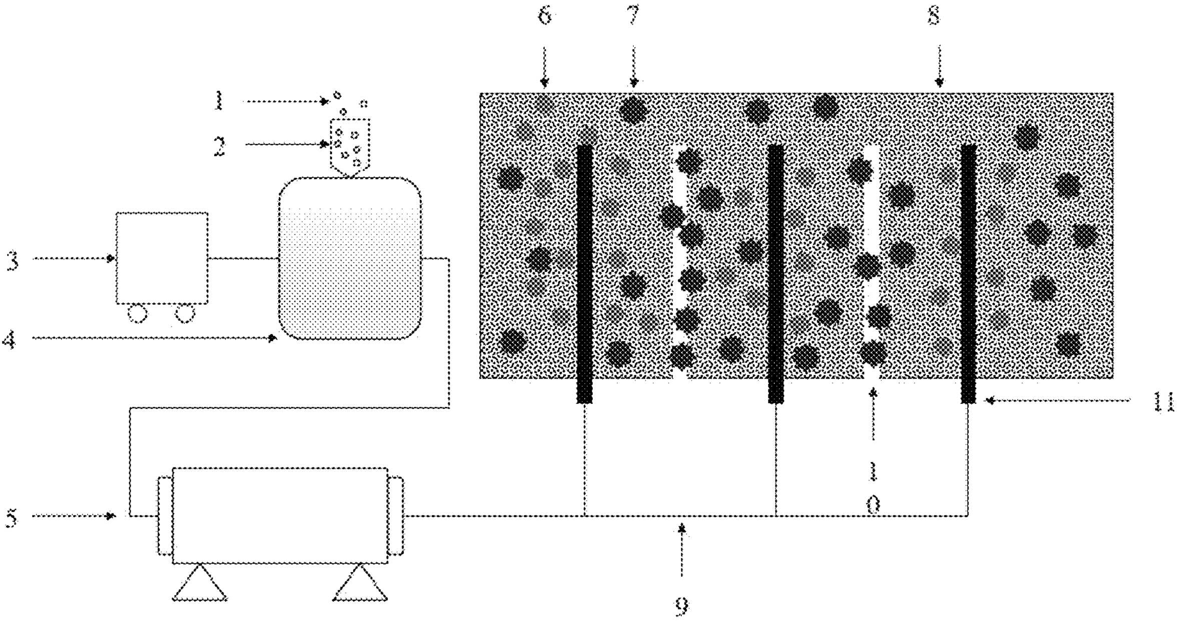
FIG. 1 is a schematic diagram of the synergistic effect enhancement of micro-nano bubbles and surfactants in the coal seam gas seepage displacement seepage water locking dust reduction method of the present invention.

As shown in FIG. 1, surfactant 1; preparation container 2; micro-nano bubble generator 3; micro-nano bubble surfactant mixing tank 4; pressure pump 5; micro-nano bubbles surface active liquid coupling medium injected into coal seams 6; coal seam gas 7; coal seam 8; pumping system 9; boundary control borehole 10; liquid injection borehole 11.

Embodiment 1

A method for coal seam gas seepage displacement, seepage water locking and dust reduction with synergistic effect of micro-nano bubbles and surfactants, comprising the following steps:

S1. Coal seam occurrence analysis: constructing of liquid injection boreholes 11 and boundary control borehole 10 based on the occurrence of coal seams, and recording parameters;

S2. Preparation of liquid gas coupling medium: adding hexadecyltrimethylammonium bromide 1 and water into a preparation container 2 to obtain a hexadecyltrimethylammonium bromide aqueous solution; cyclically extracting and discharging the hexadecyltrimethylammonium bromide aqueous solution through a ZJC-NM-200 L micro-nano bubble generator 3, and converting the gas into micro-nano bubbles through a micro-nano bubble nozzle for mixing it with the surfactant aqueous solution in a micro-nano bubble surfactant mixing tank 4 for coupling, thereby obtaining a micro-nano bubble surfactant coupling medium;

S3. Seepage displacement: using a pressure pump 5 and a pumping system 9, injecting the micro-nano bubble surface active liquid coupling medium 6 in step S2 into the coal seam 8 through the liquid injection boreholes 11 to perform seepage displacement of coal seam gas 7, achieving coal seam gas discharge or extraction;

S4. Seepage water locking: when the micro-nano bubble surface active liquid coupling medium 6 described in step S3 is stored in the coal seam 8, performing seepage water locking to realize the desorption speed suppression and emission intensity reduction of the coal seam gas;

S5. Dust reduction: when the micro-nano bubble surface active liquid coupling medium 6 described in step S3 is stored in the coal seam 8, moistening the coal seam to achieve the reversal of coal seam wetting, and increases the water content.

The following tests are carried out on the seepage displacement in step S3, the seepage water locking in step S4, and the dust reduction in step S5, respectively:

a. Seepage Displacement

Test Samples: Anthracite, Long Flame Coal.

Test conditions: place standard anthracite coal sample with a diameter of 25×50 mm and standard long flame coal sample with a diameter of 25×50 mm in a saturation chamber, connect a vacuum pump to evacuate at a pumping rate of 4 L/s for 6 hours; then place the micro-nano bubble surface active liquid gas coupling medium or distilled water medium in a liquid supply tank, and pressurize it with a pressure pump to reach and stabilize at 1.50 MPa for saturation, thereby obtaining coal sample treated with the micro-nano bubble surface active liquid gas coupling medium and those treated with the distilled water medium.

Under axial pressure of 3 and 5 MPa, and confining pressure of 3 and 5 MPa, use the coal samples treated with the micro-nano bubble surface active liquid gas coupling medium or distilled water medium to conduct seepage displacement of methane (99.99% concentration), and measure the instantaneous flow rate and gas permeability in the stable state seepage conditions, respectively.

Figure 2:
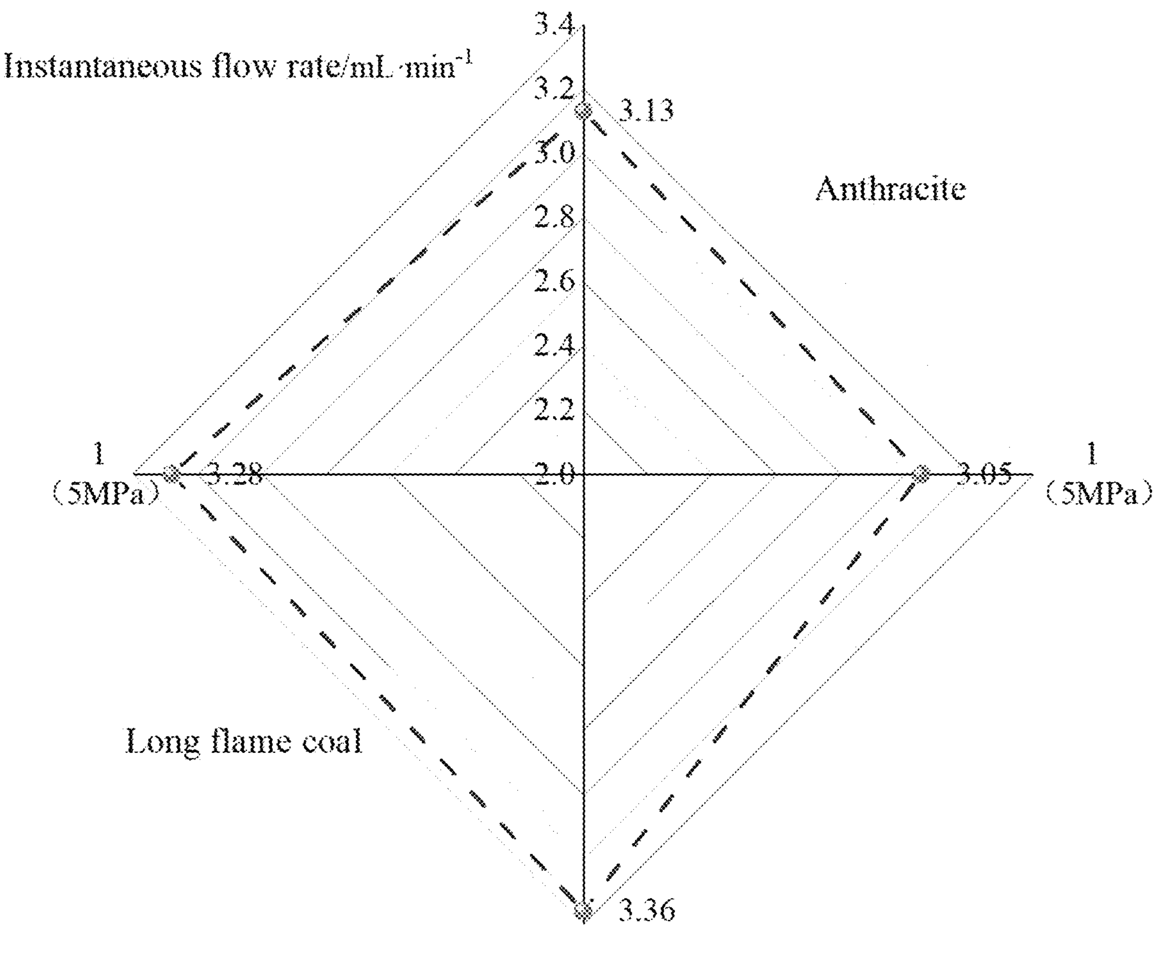
FIG. 2 is a comparative analysis of the instantaneous flow rate of anthracite and long flame coal displacement by micro-nano bubble surface active liquid coupling medium.

According to FIG. 2, under the axial pressures of 3 and 5 MPa, the confining pressures of 3 and 5 MPa, and an inlet pressure of 1 MPa, the instantaneous flow rates of anthracite coal displaced by the micro-nano bubble surface active liquid gas coupling medium are 3.13 and 3.05 $mL \cdot min^{-1}$, respectively; while for the long flame coal, the instantaneous flow rates are 3.36 and 3.28 $mL \cdot min^{-1}$, respectively.

Figure 3:
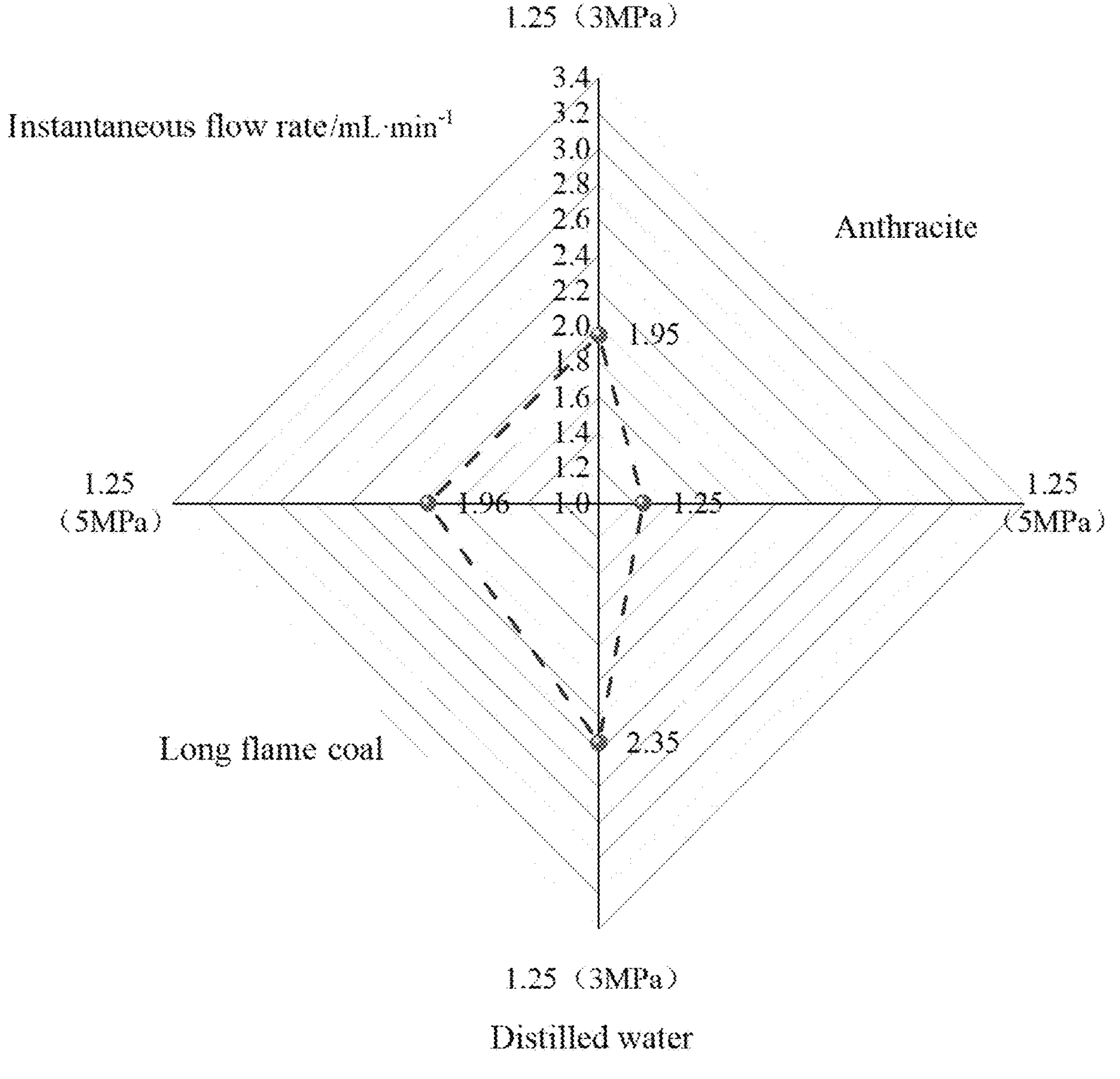
FIG. 3 is a comparative analysis of the instantaneous flow rate of anthracite and long flame coal displacement by distilled water medium.

According to FIG. 3, under the axial pressures of 3 and 5 MPa, the confining pressures of 3 and 5 MPa, and the inlet pressure of 1.25 MPa, the instantaneous flow rates of anthracite coal displaced by the micro-nano bubble surface active liquid gas coupling medium are 1.95 and 1.25 $mL \cdot min^{-1}$, respectively; while for the long flame coal, the instantaneous flow rates are 2.35 and 1.96 $mL \cdot min^{-1}$, respectively.

Figure 4:
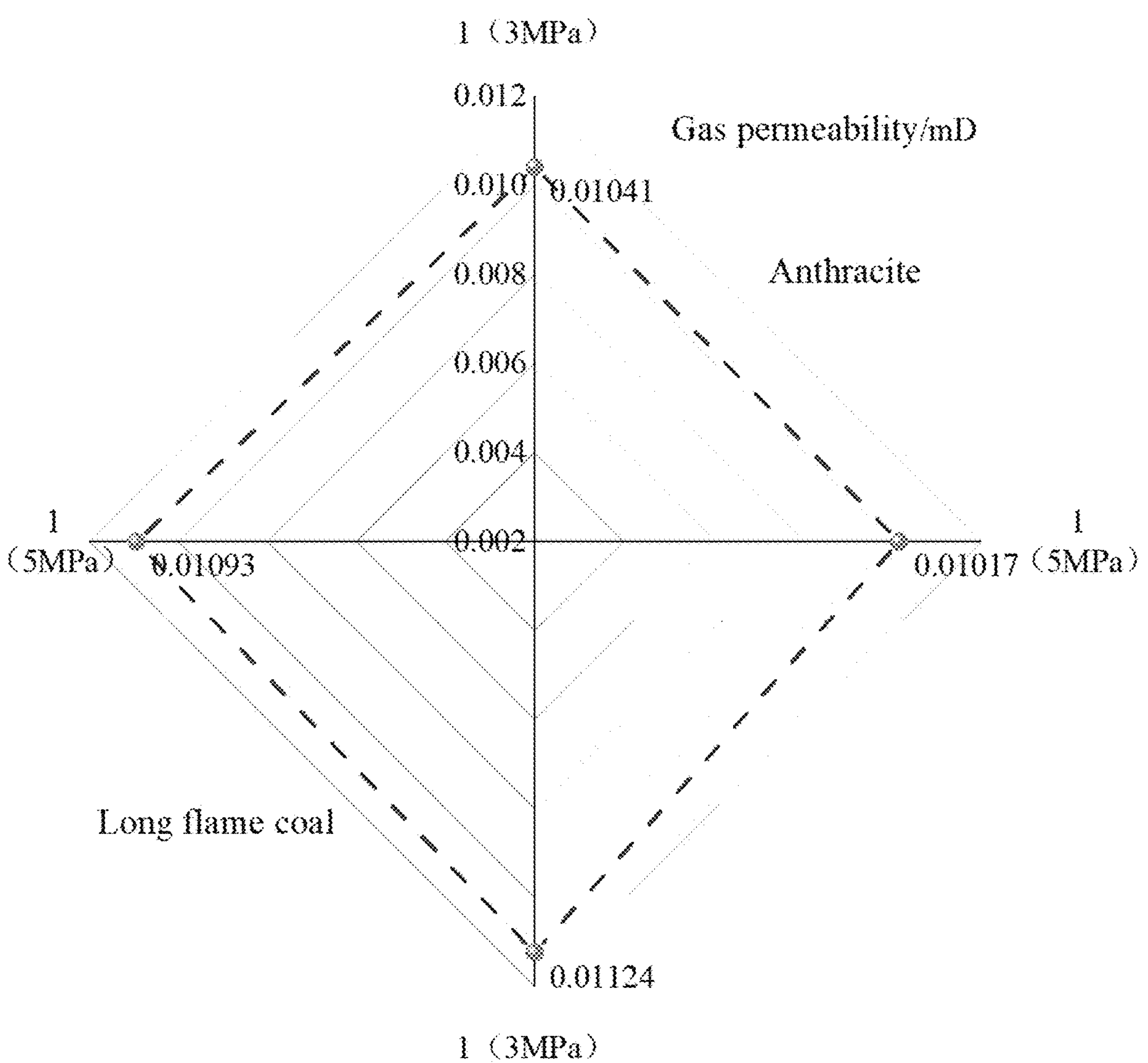
FIG. 4 is a comparative analysis of the gas permeability of anthracite and long flame coal displacement by micro-nano bubble surface active liquid coupling medium.

According to FIG. 4, under axial pressure of 3 and 5 MPa, confining pressure of 3 and 5 MPa, and inlet pressure of 1 MPa, when the anthracite coal is displaced by micro-nano bubble surface active liquid gas coupling medium, the gas measured permeability is 0.01041 and 0.01017 mD, respectively; while for the long flame coal they are 0.01124 and 0.01093 mD, respectively.

Figure 5:
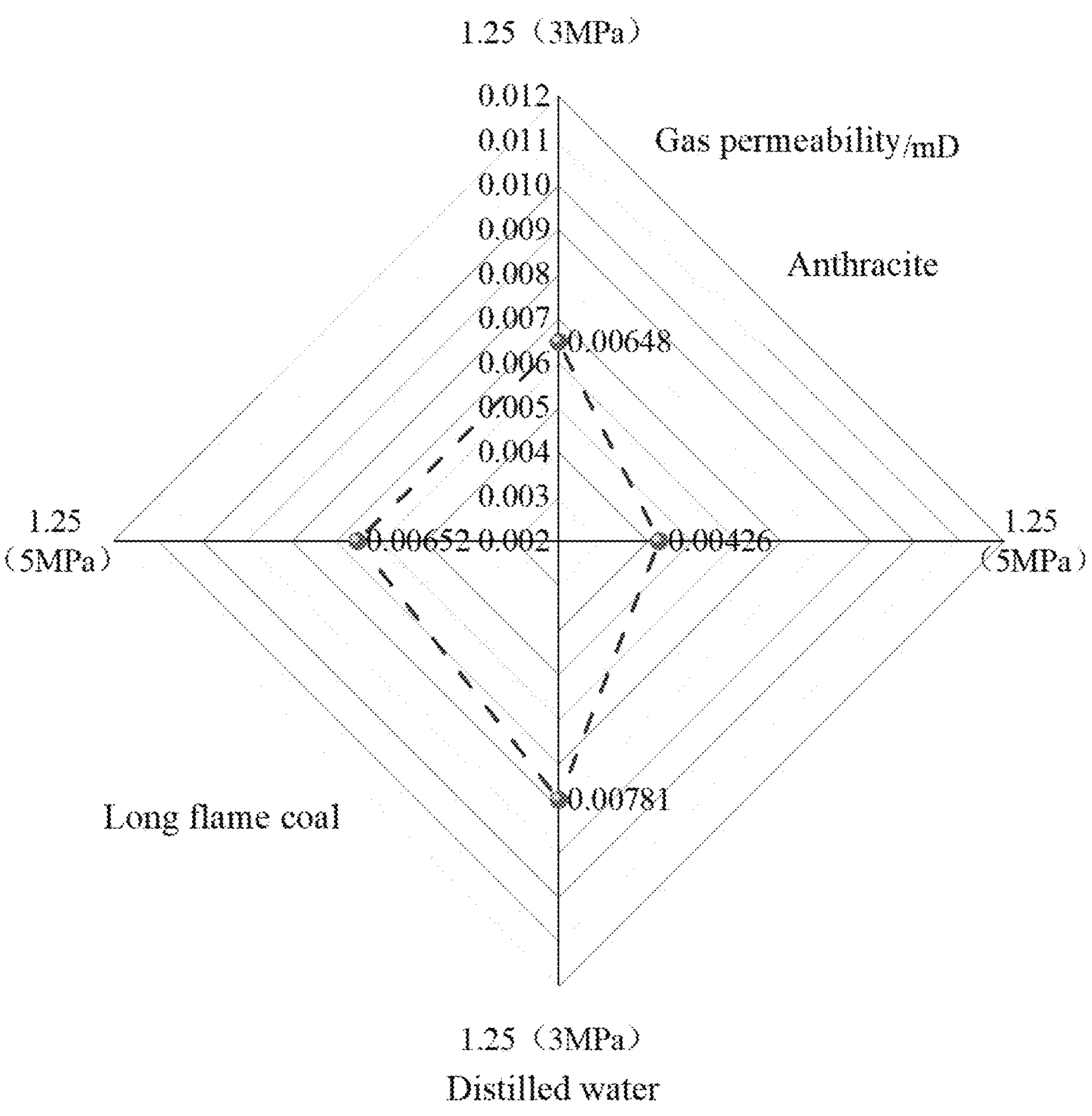
FIG. 5 shows a comparative analysis of the gas permeability of anthracite and long flame coal displacement by distilled water medium.

According to FIG. 5, under the axial pressure of 3 and 5 MPa, the confining pressure of 3 and 5 MPa, and the inlet pressure of 1.25 MPa, when anthracite coal is displaced by micro-nano bubble surface active liquid gas coupling medium, the gas permeability measured are 0.00648 and 0.00426 mD, respectively; while for the long flame coal, they are 0.00781 and 0.00652 mD, respectively.

Compared to the distilled water medium, the micro-nano bubble surface active liquid gas coupling medium increases the instantaneous flow rate and gas permeability of the anthracite coal by 1.61 times and 2.44 times, under the axial/confining pressures of 3 MPa and 5 MPa, respectively, and enhances the gas permeability by 1.61 times and 2.39 times, respectively. For long-flame coal, the micro-nano bubbles surface active liquid gas coupling medium increases the instantaneous flow rate by 1.43 times and 1.67 times under the axial/confining pressures of 3 MPa and 5 MPa, respectively, and improves the gas permeability by 1.44 times and 1.68 times, respectively.

In summary, during the liquid injection period, the present invention adopts the micro-nano bubble surface active liquid coupling medium to carry out the seepage displacement of the coal seam gas, which has good applicability to coal types. Under different axial and confining pressures, it can significantly improve the instantaneous flow rate and gas permeability of the coal seam, and has good stability and reliability, ensuring efficient discharge or extraction of coal seam gas.

b. Seepage Water Locking

Test sample: dry granular anthracite coal sample of 1-3 mm.

Test conditions: Uniformly wrap the dry granular anthracite coal sample (1-3 mm) with copper mesh and place it in the prepared water medium or micro-nano bubble surfactant liquid coupling medium for 30 minutes for spontaneous imbibition; filter the surface moisture of the coal sample and place it in a blast drying oven for 45 minutes until the surface of the coal sample is dry and free of water, while retaining the moisture inside the pores of the coal sample. Degas the sample to 4 Pa using a digital vacuum machine to discharge the dead space volume in the coal sample container, and then charge the container with 99.99% methane and place it in a constant temperature water bath at 30° C. Maintain equilibrium for over 3 hours at adsorption equilibrium pressures of 0.50, 1.50, and 2.50 MPa, respectively, and record the cumulative desorption amounts per unit mass at each pressure.

Figure 6:
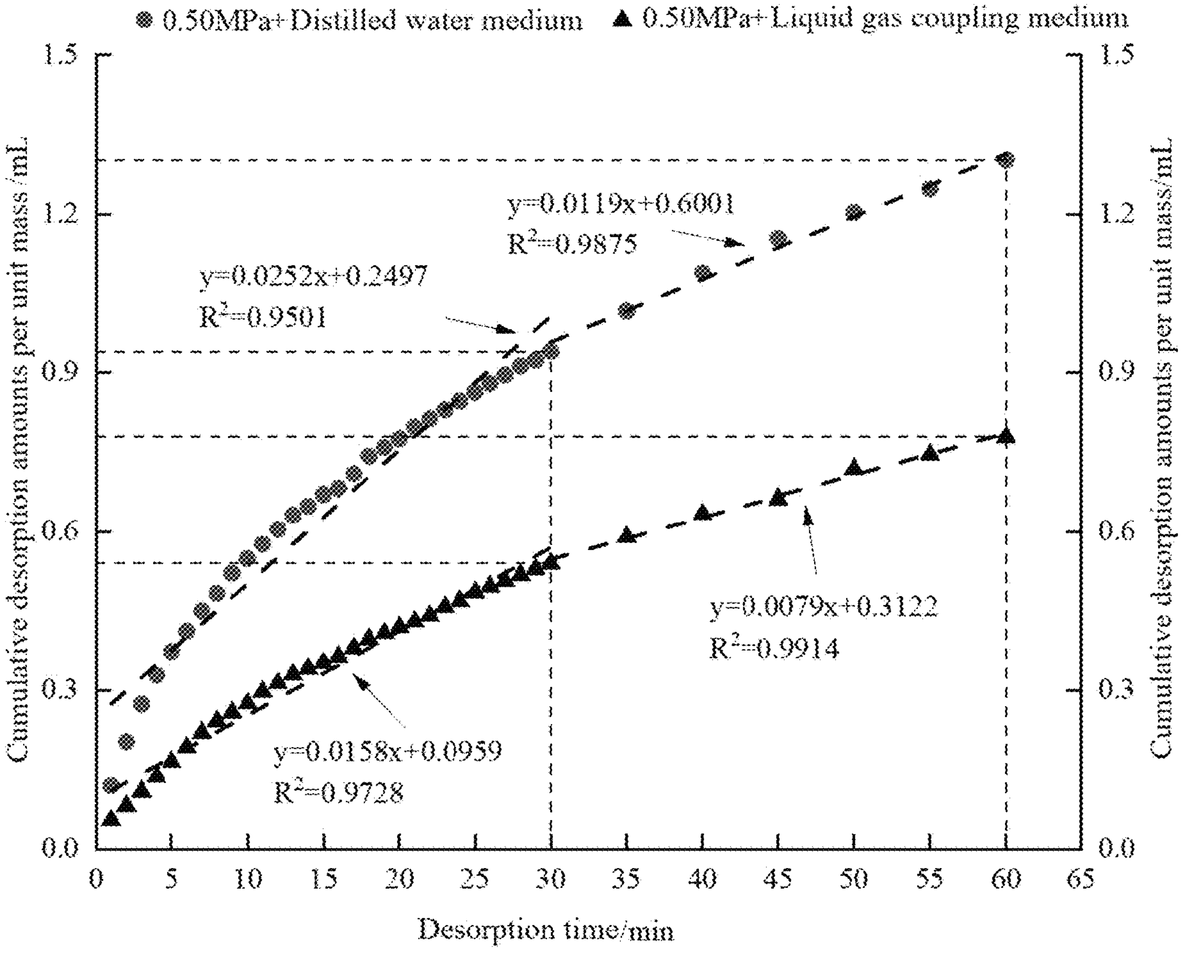
FIG. 6 shows the comparison between the desorption rate and cumulative desorption amount of 1-3 mm anthracite dry particle coal samples under adsorption equilibrium pressure of 0.50 MPa using micro-nano bubble surface active liquid coupling medium and distilled water medium.

According to FIG. 6, when the adsorption equilibrium pressure is 0.50 MPa, the cumulative desorption amounts per unit mass at 30 minutes for the coal sample treated with the distilled water medium and the micro-nano bubble surface active liquid gas coupling medium are 0.9396 and 0.5408 mL, respectively. The micro-nano bubble surface active liquid gas coupling medium treated sample is reduced by 42.44% compared to the distilled water medium-treated coal sample.

Figure 7:
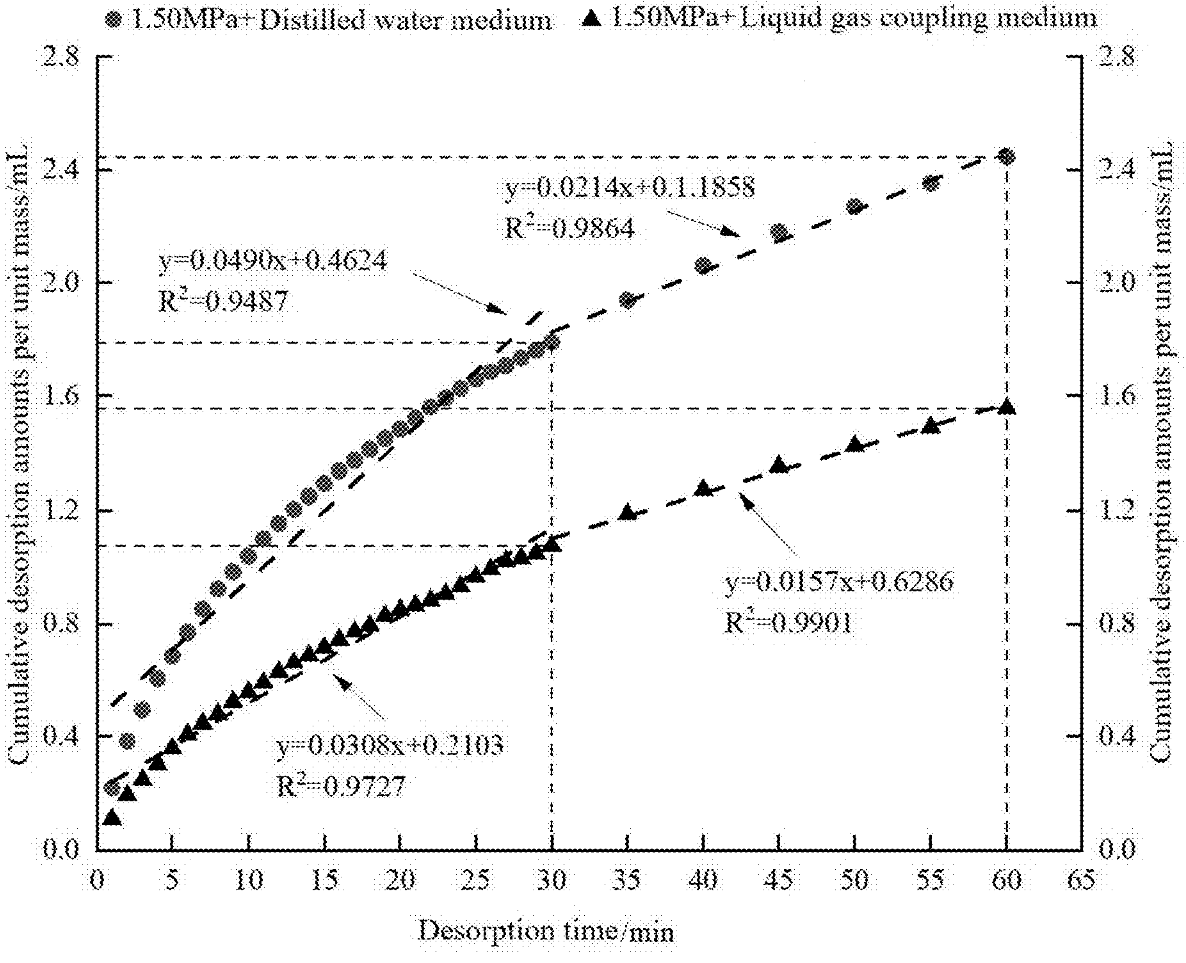
FIG. 7 shows the comparison between the desorption rate and cumulative desorption amount of 1-3 mm anthracite dry particle coal samples under adsorption equilibrium pressure of 1.50 MPa using micro-nano bubble surface active liquid coupling medium and distilled water medium.

According to FIG. 7, when the adsorption equilibrium pressure is 1.50 MPa, the cumulative desorption amounts per unit mass at 30 minutes for the coal sample treated with the distilled water medium and the coal sample in the micro-nano bubble surface active liquid gas coupling medium are 1.7912 and 1.0762 mL, respectively. The cumulative desorption per unit mass of the coal sample in the micro-nano bubble surface active liquid gas coupling medium is reduced by 39.92% compared to the distilled water medium-treated coal sample.

Figure 8:
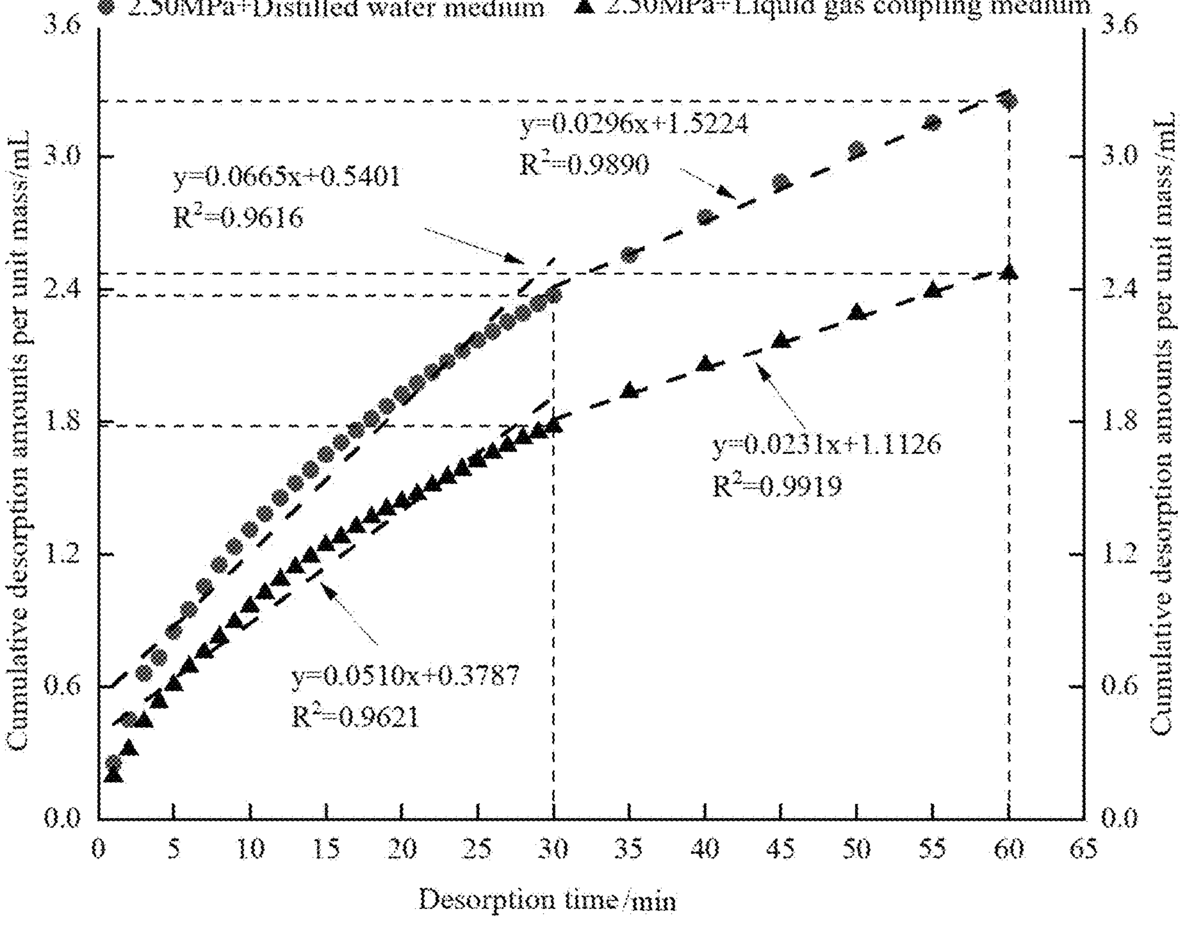
FIG. 8 shows the comparison between the desorption rate and cumulative desorption amount of 1-3 mm anthracite dry particle coal samples under adsorption equilibrium pressure of 2.50 MPa using micro-nano bubble surface active liquid coupling medium and distilled water medium.

According to FIG. 8, when the adsorption equilibrium pressure is 2.50 MPa, the cumulative desorption amounts per unit mass at 30 minutes for the coal sample treated with the distilled water medium and the micro-nano bubble surface active liquid gas coupling medium coal sample are 2.3736 and 1.7770 mL, respectively. The cumulative desorption amount per unit mass of the micro-nano bubble surface active liquid gas coupling medium coal sample is reduced by 25.13% compared to the distilled water medium-treated coal sample.

In summary, after the injection is completed, the present invention uses the micro-nano bubble surface active liquid coupling medium to lock the seepage water of coalbed methane, which can significantly suppress the desorption speed of coalbed methane under different adsorption equilibrium pressures. The reduction of desorption speed and emission intensity of coalbed methane can effectively improve the safety of coalbed methane extraction and reduce the risk of gas accidents.

c. Dust Reduction

Testing equipment: purified water curtain device.

Test conditions: tap water or micro-nano bubble surfactant liquid coupling medium is used as the spray medium, the enclosed roadway space is subject to multiple dust suppression through the water curtain device, and the total dust suppression efficiency and respiratory dust suppression efficiency are recorded respectively.

Figure 9:
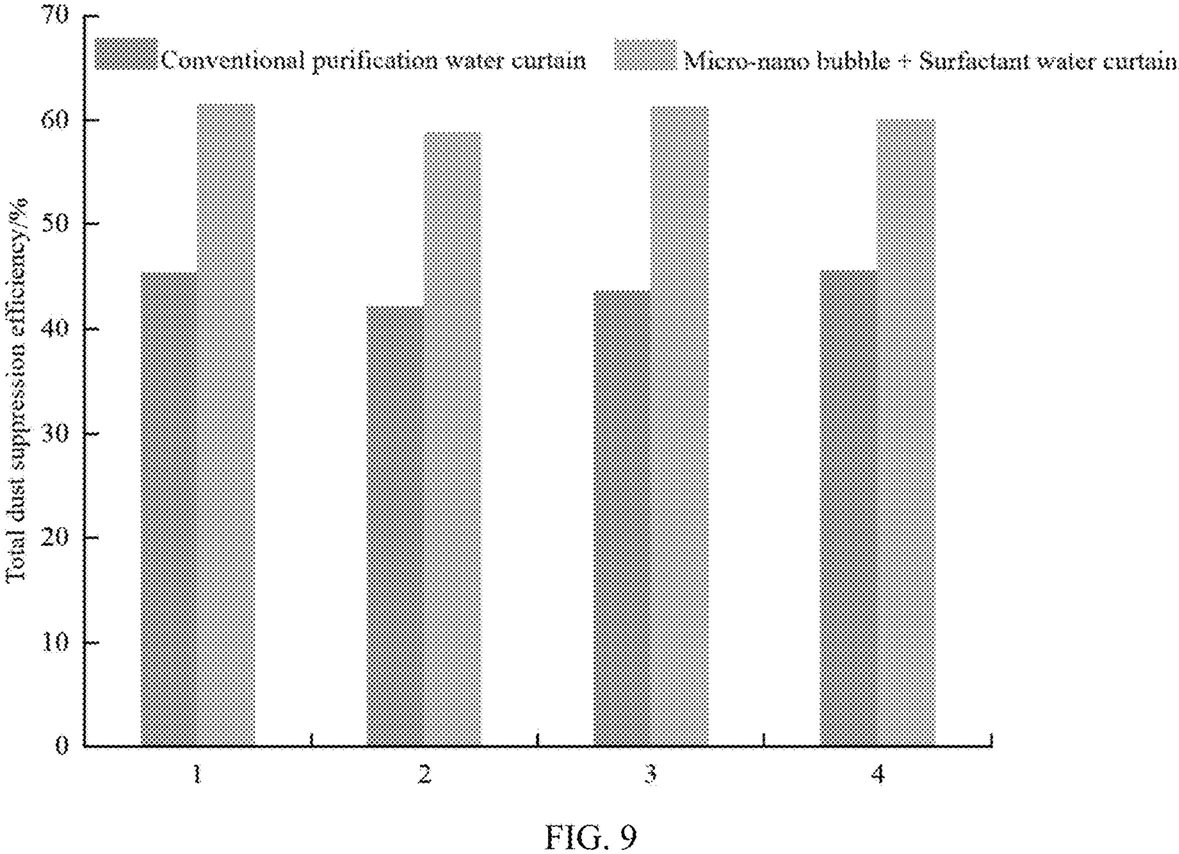
FIG. 9 is a comparison chart of the dust reduction efficiency of micro-nano bubble surfactant liquid coupling medium and conventional water medium on total dust.

According to FIG. 9, after four dust reduction tests, compared to conventional purification water curtain devices, the use of micro-nano bubble surfactant liquid coupling media can significantly improve the total dust suppression efficiency of enclosed tunnel spaces. Taking the first test as an example, the total dust suppression efficiency of the conventional purification water curtain was 44.14%, while the coupling medium of micro-nano bubbles surfactant liquid was 60.43%, which increased by 36.90% compared to the previous test.

Figure 10:
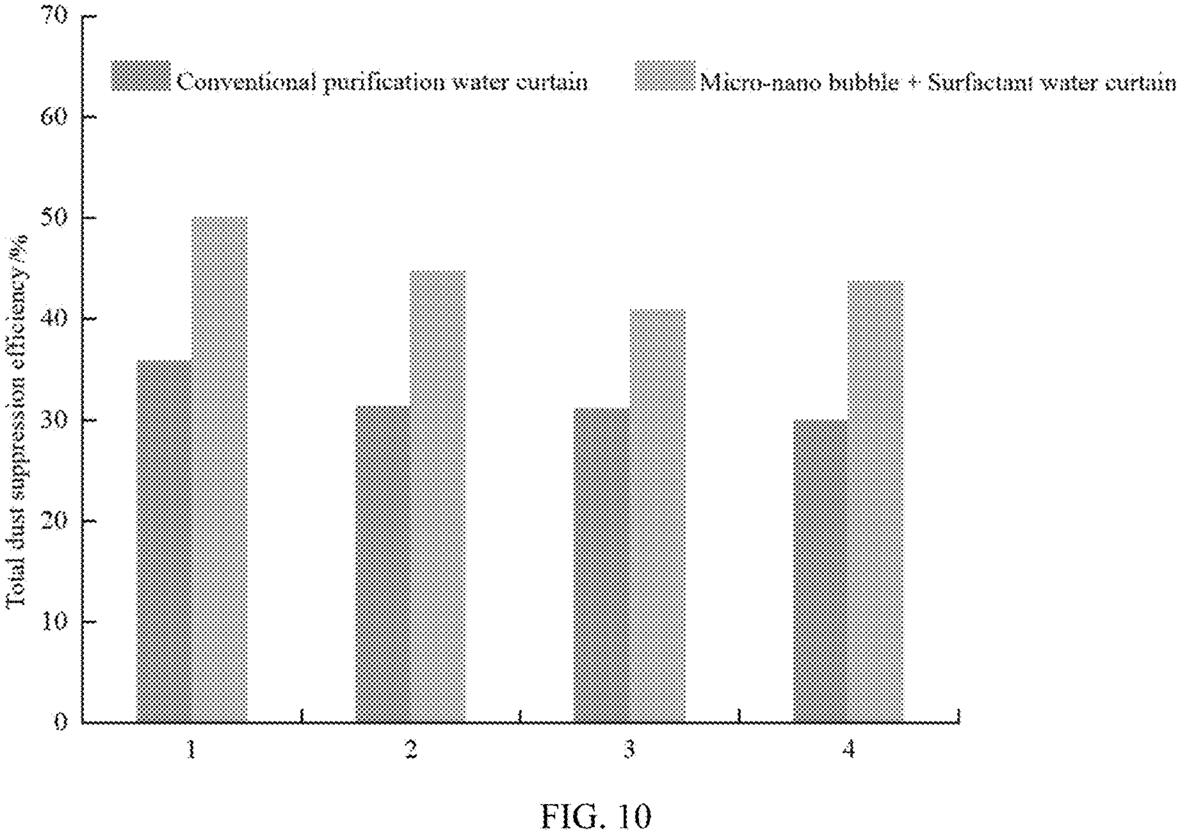
FIG. 10 is a comparison chart of the dust reduction efficiency of micro-nano bubble surfactant liquid coupling medium and conventional water medium for respiratory dust.

From FIG. 10, it can be seen that after four dust reduction tests, compared with the conventional purification water curtain using tap water medium, the use of micro-nano bubble surfactant liquid coupling medium can significantly improve the respiratory dust reduction efficiency of enclosed tunnel space. Taking the first test as an example, the respiratory dust reduction efficiency of the conventional purification water curtain was 32.75%, while the coupling medium of micro-nano bubbles surfactant liquid was 44.84%, an increase of 36.91% compared to the previous test.

In summary, after the injection is completed, the present invention uses the micro-nano bubble surface active liquid coupling medium to reduce dust in coal seam gas. In multiple tests, it has been found to improve the dust reduction efficiency of total dust and respiratory dust in enclosed tunnel spaces, effectively reducing the dust concentration in the tunnel. This helps to improve the working environment for mining and enhance the safety and comfort of miners.

The above embodiments are only used to further illustrate the technical content of the present invention for the convenience of readers to understand more easily, but it does not mean that the embodiments of the present invention are limited to these. Any technical extension or recreation made in accordance with the present invention is protected by the present invention. The scope of protection of the present invention shall be subject to the claims.

What is claimed is:

1. A method for coal seam gas seepage displacement, seepage water locking and dust reduction, comprising the following steps:

S1. Coal seam occurrence analysis: drilling liquid injection boreholes and boundary control boreholes based on occurrences of coal seams, and recording parameters;

wherein the liquid injection boreholes are configured for injecting micro-nano bubble surface active liquid coupling medium, and the boundary control boreholes is used for controlling gas flow and discharge direction;

S2. Preparation of liquid gas coupling medium: adding a surfactant and water into a preparation container to obtain a surfactant aqueous solution, cyclically extracting and discharging the surfactant aqueous solution through a micro-nano bubble generator, and converting a gas into micro-nano bubbles through a micro-nano bubble nozzle for mixing into the surfactant aqueous solution for coupling, thereby obtaining a micro-nano bubble surface active liquid coupling medium;

S3. Seepage displacement: using a pressure pump and a pumping system, injecting the micro-nano bubble surface active liquid coupling medium in step S2 into the coal seams through the liquid injection boreholes to perform seepage displacement of coal seam gas, achieving coal seam gas discharge or extraction;

S4. Seepage water locking: storing the micro-nano bubble surface active liquid coupling medium described in step S3 in the coal seams, thereby performing seepage water locking to the coal seams to realize the desorption speed suppression and emission intensity reduction of the coal seam gas; and S5. Dust reduction: when the micro-nano bubble surface active liquid coupling medium described in step S3 is stored in the coal seams, moistening the coal seams to achieve a reversal of coal seam wetting and increasing a water content.

2. The method according to claim 1, wherein the type of liquid injection boreholes and boundary control boreholes in step S1 is one of through-layer boreholes or bedding boreholes.

3. The method according to claim 1, wherein the surfactant in step S2 is one of hexadecyltrimethylammonium bromide, polyacrylamide, or polyethylene oxide.

4. The method according to claim 1, wherein the gas in step S2 is one of air, carbon dioxide, or nitrogen.

5. The method according to claim 1, wherein when the micro-nano bubble surface active liquid coupling medium in step S3 is injected into the coal seams, the pressure is set to low pressure, medium pressure, high pressure, or ultra-high pressure; the low pressure is ≤10 MPa, the medium pressure is 10-30 MPa, the high pressure is 30-50 MPa; and the ultra-high pressure is 50 MPa; the pumping flow rate is 10 $m^3$/h, 15 $m^3$/h, 20 $m^3$/h, 30 $m^3$/h, 40 $m^3$/h, 50 $m^3$/h, 60 $m^3$/h or 70 $m^3$/h.

6. The method according to claim 1, wherein an injection time for injecting the micro-nano bubble surface active liquid coupling medium in step S3 into the coal seams is based on water outflow from a coal wall, water outflow from the boundary boreholes, or a 30% decrease in water injection pressure.

7. The method according to claim 1, wherein during the seepage displacement in step S3, when coal seam gas is discharged, the boundary control borehole is in a natural discharge state; when the coal seam gas is extracted, the boundary control boreholes are merged into an extraction pipeline network; during the seepage water locking in step S4, the boundary control borehole is in a natural discharge state.

8. The method according to claim 1, wherein during the seepage displacement in step S3, an effect and action period of the seepage displacement is determined by a concentration and a flow rate of the boundary control boreholes.

9. The method according to claim 1, wherein during the seepage water locking in step S4, an effect and action period of the seepage water locking is determined by measuring a coal seam gas content at different distances from the liquid injection boreholes, a gas desorption index K1 value of drilling cuttings, and a gas emission volume during excavation and mining.

10. The method according to claim 1, wherein during the dust reduction in step S5, a dust reduction effect and action period is determined by measuring a coal seam moisture content, a wetting degree, dust generation volume during mining operations, dust particle size, and dust concentration at different distances from the injection boreholes.

* * * * *